US010526923B2

(12) United States Patent
Fujimura et al.

(10) Patent No.: US 10,526,923 B2
(45) Date of Patent: Jan. 7, 2020

(54) COMBINED CYCLE PLANT, CONTROL METHOD OF SAME, AND CONTROL DEVICE OF SAME

(71) Applicant: MITSUBISHI HITACHI POWER SYSTEMS, LTD., Kanagawa (JP)

(72) Inventors: Daiki Fujimura, Yokohama (JP); Masayuki Murakami, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 583 days.

(21) Appl. No.: 15/118,320

(22) PCT Filed: Feb. 20, 2015

(86) PCT No.: PCT/JP2015/054798
§ 371 (c)(1),
(2) Date: Aug. 11, 2016

(87) PCT Pub. No.: WO2015/151641
PCT Pub. Date: Oct. 8, 2015

(65) Prior Publication Data
US 2017/0138220 A1    May 18, 2017

(30) Foreign Application Priority Data

Mar. 31, 2014    (JP) .................................. 2014-071408

(51) Int. Cl.
*F01K 13/02*    (2006.01)
*F02C 7/042*    (2006.01)
(Continued)

(52) U.S. Cl.
CPC ............ *F01K 13/02* (2013.01); *F01D 17/145* (2013.01); *F01K 7/16* (2013.01); *F01K 11/02* (2013.01);
(Continued)

(58) Field of Classification Search
CPC . F01K 13/02; F01K 7/16; F01K 11/02; F02C 7/042; F02C 7/057; F02C 9/20; F01D 17/145; Y02E 20/16
See application file for complete search history.

(56) References Cited

U.S. PATENT DOCUMENTS 3,974,645 A * 8/1976 Smith .................... F01K 23/105
60/794
4,638,630 A * 1/1987 Martens .................. F01D 21/12
60/39.182
(Continued)

FOREIGN PATENT DOCUMENTS

DE           3915478          11/1989
JP         61-171834           8/1986
(Continued)

OTHER PUBLICATIONS

International Search Report dated May 26, 2015 in International Application No. PCT/JP2015/054798 (with English translation).
(Continued)

*Primary Examiner* — Carlos A Rivera
(74) *Attorney, Agent, or Firm* — Wenderoth, Lind & Ponack, L.L.P.

(57) ABSTRACT

A control device includes a mode-recognizing unit that recognizes whether a start mode of a steam turbine is a cold mode in which a temperature of a steam contact portion of the steam turbine is lower than a predetermined temperature or a different start mode in which the temperature of the steam contact portion is equal to or higher than the predetermined temperature, a first opening generator that generates a first degree of opening greater than a second degree of opening in the different start mode as a degree of opening of an intake air regulator of a compressor in a period after generation of steam from an exhaust heat recovery boiler is started and before supplying of the steam to the steam
(Continued)

turbine is started, and a command output unit that outputs a command corresponding to the first degree of opening to the intake air regulator.

5 Claims, 5 Drawing Sheets

(51) Int. Cl.
    *F02C 7/057*     (2006.01)
    *F01K 23/10*     (2006.01)
    *F02C 6/18*     (2006.01)
    *F01D 17/14*     (2006.01)
    *F01K 7/16*     (2006.01)
    *F01K 11/02*     (2006.01)

(52) U.S. Cl.
    CPC ............... *F01K 23/10* (2013.01); *F02C 6/18* (2013.01); *F02C 7/042* (2013.01); *F02C 7/057* (2013.01); *F05D 2220/32* (2013.01); *F05D 2220/72* (2013.01); *F05D 2260/20* (2013.01)

(56) References Cited

U.S. PATENT DOCUMENTS

| | | | | |
|---|---|---|---|---|
| 5,044,152 | A * | 9/1991 | Hoizumi | ............... F01K 23/101 60/39.182 |
| 5,323,328 | A * | 6/1994 | Tanaka | ............... F01K 13/02 700/287 |
| 9,404,426 | B2 * | 8/2016 | Wichmann | ............... F02C 9/50 |
| 2010/0189551 | A1 * | 7/2010 | Ballard, Jr. | ............. F01D 11/24 415/175 |
| 2014/0169948 | A1 * | 6/2014 | Kay | ............. F01D 17/162 415/148 |
| 2015/0138911 | A1 * | 5/2015 | Pan | ............. B01F 5/0057 366/165.1 |

FOREIGN PATENT DOCUMENTS

| | | |
|---|---|---|
| JP | 1-285608 | 11/1989 |
| JP | 2-130202 | 5/1990 |
| JP | 3-290006 | 12/1991 |
| JP | 7-310505 | 11/1995 |
| JP | 9-195717 | 7/1997 |
| JP | 2000-45791 | 2/2000 |
| JP | 2007-40171 | 2/2007 |
| JP | 2007-211705 | 8/2007 |
| JP | 2008-128086 | 6/2008 |
| JP | 2012-57585 | 3/2012 |

OTHER PUBLICATIONS

Written Opinion of the International Searching Authority dated May 26, 2015 in International Application No. PCT/JP2015/054798 (with English translation).

* cited by examiner

COMBINED CYCLE PLANT, CONTROL METHOD OF SAME, AND CONTROL DEVICE OF SAME

TECHNICAL FIELD

The present invention relates to a combined cycle plant, a control method thereof, and a control device thereof.

Priority is claimed on Japanese Patent Application No. 2014-071408, filed Mar. 31, 2014, the content of which is incorporated herein by reference.

BACKGROUND ART

A combined cycle plant includes a gas turbine that is driven by combustion gas, an exhaust heat recovery boiler that generates steam using heat of the combustion gas discharged from the gas turbine, and a steam turbine that is driven by steam.

Patent Literature 1 discloses a starting method of a combined cycle plant. In this starting method, in order to acquire a main steam temperature which is determined on the basis of a temperature of the steam turbine at the time of start, a temperature of exhaust gas of the gas turbine is controlled such that the temperature of the exhaust gas is equal to or lower than a predetermined upper limit. In the starting method, the upper limit is determined depending on a temperature of a steam contact portion in the steam turbine at the time of start. In the starting method, in order to control the temperature of the exhaust gas, a degree of opening of an inlet guide vane which is disposed in a compressor of the gas turbine is adjusted such that the actual temperature of the exhaust gas is equal to or less than the upper limit.

CITATION LIST

Patent Literature

[Patent Literature 1]
Japanese Unexamined Patent Application, First Publication No. Hei 07-310505

SUMMARY OF INVENTION

Technical Problem

In the combined cycle plant, at the time of start of the steam turbine, it is necessary to suppress a temperature difference between a metal temperature of the steam turbine and a temperature of steam flowing in the steam turbine at the time of start in order to suppress the occurrence of thermal stress. When the combined cycle plant is stopped for the purpose of periodic inspection or the like, it is preferable that the metal temperature of the steam turbine be lowered in a short time in order to secure the work time of the periodic inspection.

However, with recent increases in the efficiency of gas turbines, a combustion gas inlet temperature in a turbine portion of the gas turbine has been raised. Accordingly, the steam temperature is also raised and it is thus difficult to suppress the temperature difference between the metal temperature of the steam turbine and the temperature of steam flowing in the steam turbine at the time of start. At the time of stop of the steam turbine, it is difficult to lower the metal temperature in a short time.

Therefore, a first object of the present invention is to provide a technique by which a temperature difference between a temperature of a steam contact portion of a steam turbine and a temperature of steam flowing therein at the time of start can be suppressed by simple control. A second object of the present invention is to provide a technique by which the temperature of the steam contact portion can be lowered in a short time at the time of stop of the steam turbine.

Solution to Problem

In order to achieve the above-mentioned first object, a first aspect of the present invention provides a control device of a combined cycle plant including a gas turbine that is driven by combustion gas, an exhaust heat recovery boiler that generates steam by heat of the combustion gas discharged from the gas turbine, and a steam turbine that is driven by the steam, in which the gas turbine includes an intake air regulator that regulates an amount of intake air, the control device including: a mode-recognizing unit that recognizes a start mode of the steam turbine; and a command output unit that outputs a command indicating a degree of opening of the intake air regulator to the intake air regulator, wherein the command output unit outputs a command indicating a degree of opening corresponding to the start mode recognized by the mode-recognizing unit to the intake air regulator.

Specifically, a control device of a combined cycle plant including a gas turbine that is driven by combustion gas, an exhaust heat recovery boiler that generates steam by heat of the combustion gas discharged from the gas turbine, and a steam turbine that is driven by the steam, in which the gas turbine includes an intake air regulator that regulates an amount of intake air, includes: a mode-recognizing unit that recognizes whether a start mode of the steam turbine is a cold mode in which a temperature of a steam contact portion of the steam turbine is lower than a predetermined temperature or a different start mode in which the temperature of the steam contact portion is equal to or higher than the predetermined temperature; a first opening generator that generates a first degree of opening greater than a second degree of opening in the different start mode as a degree of opening of the intake air regulator in a steam turbine pre-start period after the gas turbine is started to generate steam from the exhaust heat recovery boiler and before supplying of the steam to the steam turbine is started; and a command output unit that outputs a command indicating the degree of opening of the intake air regulator to the intake air regulator, wherein the command output unit outputs a command corresponding to the first degree of opening to the intake air regulator in the steam turbine pre-start period when the mode-recognizing unit recognizes that the start mode is the cold mode.

In the control device, when the start mode of the steam turbine is the cold mode, the degree of opening of the intake air regulator is set to be greater than that in the different start mode. Accordingly, in the control device, in the cold mode, the temperature of the combustion gas in the gas turbine is lower and the temperature of steam is lower in comparison with the temperatures in the different start mode. As a result, in the control device, in the cold mode in which the temperature of the steam contact portion of the steam turbine is lower than the predetermined temperature, the temperature of steam is lower than that in the different start mode and it is thus possible to suppress a temperature difference between the temperature of steam and the temperature of the steam contact portion.

In the control device, opening control in the cold mode and opening control in the different start mode are performed using the first degree of opening and the second degree of opening appropriately. Accordingly, in the control device, it is possible to control the degree of opening of the intake air regulator before the supplying of steam to the steam turbine is started using a simple method. In other words, in the control device, it is possible to simplify the configuration of a part that controls the degree of opening of the intake air regulator before the supplying of steam to the steam turbine is started.

Here, the control device may further include: a second opening generator that generates the second degree of opening as the degree of opening of the intake air regulator in the different start mode; and a first switch that selectively sends one of the first degree of opening and the second degree of opening to the command output unit, and the first switch may send the first degree of opening to the command output unit in the steam turbine pre-start period when the mode-recognizing unit recognizes that the start mode is the cold mode.

The control device having the first switch may further include: a third opening generator that generates a third degree of opening of which the degree of opening at the time of start of the supplying of steam is less than the first degree of opening immediately before the supplying of steam is started as the degree of opening after the supplying of steam to the steam turbine is started; a third switch that switches the degree of opening to be sent to the command output unit from the first degree of opening to the third degree of opening on the condition that the supplying of steam to the steam turbine is started; and a limiter that limits an opening variation rate which is a variation of the degree of opening per unit time to a predetermined value or less such that the degree of opening gradually varies from the first degree of opening immediately before the switching of the third switch to the third degree of opening immediately after the switching of the third switch.

In the control device, even when there is a difference between one degree of opening and another degree of opening at the time of switching one of the degrees of opening generated from the opening generators to another, the degree of opening gradually varies from one degree of opening to another degree of opening and it is thus possible to suppress disorder of a control system at the time of switching the degree of opening.

In the control device including the third opening generator, the third opening generator may generate the third degree of opening corresponding to an output of the gas turbine at the present moment using a predetermined relationship between the output of the gas turbine and the third degree of opening.

In the control device including the third opening generator, the second opening generator may constitute the third opening generator, generate the third degree of opening corresponding to the output of the gas turbine at the present moment using the predetermined relationship, and generate the second degree of opening corresponding to the output of the gas turbine at the present moment.

Any one of the above-described control devices including the first switch may further include: a gas turbine start opening generator that generates a gas turbine start degree of opening which is the degree of opening of the intake air regulator until the gas turbine enters a predetermined state at the time of start of the gas turbine; and a second switch that sends the gas turbine start degree of opening to the command output unit until the gas turbine enters the predetermined state and sends the first degree of opening or the second degree of opening to the command output unit on the condition that the gas turbine enters the predetermined state.

The control device including the second switch may further include a limiter that limits an opening variation rate which is a variation of the degree of opening per unit time to a predetermined value or less such that the degree of opening gradually varies from the gas turbine start degree of opening immediately before the switching of the second switch to the first degree of opening immediately after the switching of the second switch.

In the control device, even when there is a difference between one degree of opening and another degree of opening at the time of switching one of the degrees of opening generated from the opening generators to another, the degree of opening gradually varies from one degree of opening to another degree of opening and it is thus possible to suppress disorder of a control system at the time of switching the degree of opening.

In order to achieve the above-mentioned object, a second aspect of the present invention provides any one of the above-described control devices further including: a stop mode-recognizing unit that recognizes whether a stop mode at the time of stop of the steam turbine is a cooling stop mode in which the temperature of the steam contact portion at the time of stop of the steam turbine is lower than a predetermined temperature or a different stop mode in which the temperature of the steam contact portion is equal to or higher than the predetermined temperature; and a fourth opening generator that generates a fourth degree of opening greater than a fifth degree of opening in the different stop mode as the degree of opening of the intake air regulator in the course of stopping the steam turbine along with the gas turbine, wherein the command output unit may output a command corresponding to the fourth degree of opening to the intake air regulator in the course of stopping the steam turbine when the stop mode-recognizing unit recognizes that the stop mode is the cooling stop mode.

In the control device, when the stop mode of the steam turbine is the cooling stop mode, the degree of opening of the intake air regulator is set to be greater than that in the different stop mode. Accordingly, in the control device, in the cooling stop mode, the temperature of the combustion gas is lower and the temperature of steam is lower in comparison with the temperatures in the different stop mode. As a result, in the control device, when the cooling stop mode is selected as the stop mode of the steam turbine, the temperature of steam is lower than that in the different stop mode and it is thus possible to lower the temperature of the steam turbine in a short time.

In the control device, opening control in the cooling stop mode and opening control in the different stop mode are performed using the fourth degree of opening and the fifth degree of opening appropriately. Accordingly, in the control device, it is possible to control the degree of opening of the intake air regulator in the course of stopping the steam turbine using a simple method. In other words, in the control device, it is possible to simplify the configuration of a part that controls the degree of opening of the intake air regulator in the course of stopping the steam turbine.

Here, in the control device according to the second aspect, the mode-recognizing unit may constitute the stop mode-recognizing unit and recognize the stop mode along with the start mode.

In any one of the above-described control devices including the control device according to the second aspect, the first opening generator may constitute the fourth opening generator and generate the same degree of opening as the first degree of opening as the fourth degree of opening along with the first degree of opening.

In any one of the above-described control devices including the control device according to the second aspect, the combined cycle plant may include a steam flow control valve that controls a flow rate of the steam flowing in the steam turbine, the control device may further include: a fifth opening generator that generates the fifth degree of opening in the different stop mode; and a switch that selectively sends one of the fourth degree of opening and the fifth degree of opening to the command output unit, and the switch may send the fourth degree of opening to the command output unit on the condition that the stop mode-recognizing unit recognizes that the stop mode is the cooling stop mode and closing of the steam flow control valve is started in the course of stopping the steam turbine.

The control device including the fifth opening generator may further include: a sixth opening generator that generates a sixth degree of opening of which the degree of opening immediately before the closing of the steam flow control valve is started is less than the fourth degree of opening at the time of start of the closing of the steam flow control valve as the degree of opening of the intake air regulator before the closing of the steam flow control valve is started in the course of stopping the steam turbine; and a limiter that limits an opening variation rate which is a variation of the degree of opening per unit time to a predetermined value or less such that the degree of opening gradually varies from the sixth degree of opening immediately before the switching of the switch to the fourth degree of opening immediately after the switching of the switch.

In the control device, even when there is a difference between one degree of opening and another degree of opening at the time of switching one of the degrees of opening generated from the opening generators to another, the degree of opening gradually varies from one degree of opening to another degree of opening and it is thus possible to suppress disorder of a control system at the time of switching the degree of opening.

In the control device including the sixth opening generator, the fifth opening generator may constitute the sixth opening generator and generate the fifth degree of opening and the sixth degree of opening, and the sixth degree of opening immediately before the switching of the switch may be the same degree of opening as the fifth degree of opening immediately after the switching of the switch.

In any one of the above-described control devices including the sixth opening generator, the sixth opening generator may generate the sixth degree of opening corresponding to the output of the gas turbine at the present moment using a predetermined relationship between the output of the gas turbine and the sixth degree of opening.

In any one of the above-described control devices including the sixth opening generator, the third opening generator may constitute the sixth opening generator, the predetermined relationship between the output of the gas turbine and the third degree of opening may be the same as the predetermined relationship between the output of the gas turbine and the sixth degree of opening, and the third opening generator may generate the third degree of opening or the sixth degree of opening corresponding to the output of the gas turbine at the present moment using the predetermined relationship.

In any one of the above-described control devices, the mode-recognizing unit may recognize whether the start mode is the cold mode or the different start mode depending on the temperature of the steam contact portion of the steam turbine which is detected using a thermometer.

In order to achieve the second object, a third aspect of the present invention provides a control device of a combined cycle plant including a gas turbine that is driven by combustion gas, an exhaust heat recovery boiler that generates steam by heat of the combustion gas discharged from the gas turbine, and a steam turbine that is driven by the steam, in which the gas turbine includes an intake air regulator that regulates an amount of intake air, the control device including: a stop mode-recognizing unit that recognizes whether a stop mode at the time of stop of the steam turbine is a cooling stop mode in which a temperature of a steam contact portion at the time of stop of the steam turbine is lower than a predetermined temperature or a different stop mode in which the temperature of the steam contact portion is equal to or higher than the predetermined temperature; a first opening generator that generates a first degree of opening greater than a second degree of opening in the different stop mode as a degree of opening of the intake air regulator in the course of stopping the steam turbine along with the gas turbine; and a command output unit that outputs a command indicating the degree of opening of the intake air regulator to the intake air regulator, wherein the command output unit outputs a command corresponding to the first degree of opening to the intake air regulator in the course of stopping the steam turbine when the stop mode-recognizing unit recognizes that the stop mode is the cooling stop mode.

In the control device, when the stop mode of the steam turbine is the cooling stop mode, the degree of opening of the intake air regulator is set to be greater than that in the different stop mode. Accordingly, in the control device, in the cooling stop mode, the temperature of the combustion gas is lower and the temperature of steam is lower in comparison with the temperatures in the different stop mode. As a result, in the control device, when the cooling stop mode is selected as the stop mode of the steam turbine, the temperature of steam is lower than that in the different stop mode and it is thus possible to lower the temperature of the steam turbine in a short time.

In the control device, opening control in the cooling stop mode and opening control in the different stop mode are performed using the first degree of opening and the second degree of opening appropriately. Accordingly, in the control device, it is possible to control the degree of opening of the intake air regulator in the course of stopping the steam turbine using a simple method. In other words, in the control device, it is possible to simplify the configuration of a part that controls the degree of opening of the intake air regulator in the course of stopping the steam turbine.

Here, in the control device according to the third aspect, the combined cycle plant may include a steam flow control valve that controls a flow rate of the steam flowing in the steam turbine, the control device may further include: a second opening generator that generates the second degree of opening in the different stop mode; and a switch that selectively sends one of the first degree of opening and the second degree of opening to the command output unit, and the switch may send the first degree of opening to the command output unit on the condition that the stop mode-recognizing unit recognizes that the stop mode is the cooling stop mode and closing of the steam flow control valve is started in the course of stopping the steam turbine.

The control device including the second opening generator may further include: a third opening generator that generates a third degree of opening of which the degree of opening immediately before the closing of the steam flow control valve is started is less than the first degree of opening at the time of start of the closing of the steam flow control valve as the degree of opening of the intake air regulator before the closing of the steam flow control valve is started in the course of stopping the steam turbine; and a limiter that limits an opening variation rate which is a variation of the degree of opening per unit time to a predetermined value or less such that the degree of opening gradually varies from the third degree of opening immediately before the switching of the switch to the first degree of opening immediately after the switching of the switch.

In the control device including the third opening generator, the second opening generator may constitute the third opening generator and generate the second degree of opening and the third degree of opening, and the third degree of opening immediately before the switching of the switch may be the same degree of opening as the second degree of opening immediately after the switching of the switch.

In the control device including the third opening generator, the third opening generator may generate the third degree of opening corresponding to the output of the gas turbine at the present moment using a predetermined relationship between the output of the gas turbine and the third degree of opening.

Any one of the above-described control devices including the stop mode-recognizing unit may further include a stop mode receiver that receives information as to whether the stop mode should be set to the cooling stop mode or the different stop mode, and the stop mode-recognizing unit may recognize whether the stop mode is the cooling stop mode or the different stop mode depending on details received by the stop mode receiver.

A combined cycle plant according to another aspect of the present invention includes: any one of the above-described control devices; the gas turbine; the exhaust heat recovery boiler; and the steam turbine.

In order to achieve the first object, the first aspect of the present invention provides a control method of a combined cycle plant including a gas turbine that is driven by combustion gas, an exhaust heat recovery boiler that generates steam by heat of the combustion gas discharged from the gas turbine, and a steam turbine that is driven by the steam, in which the gas turbine includes an intake air regulator that regulates an amount of intake air, the control method including: a start mode-recognizing step of recognizing whether a start mode of the steam turbine is a cold mode in which a temperature of a steam contact portion of the steam turbine is lower than a predetermined temperature or a different start mode in which the temperature of the steam contact portion is equal to or higher than the predetermined temperature; and a command output step of outputting a command corresponding to a first degree of opening greater than a second degree of opening in the different start mode to the intake air regulator as a command indicating a degree of opening of the intake air regulator in a steam turbine pre-start period before supplying of the steam to the steam turbine is started, when it is recognized in the start mode-recognizing step that the start mode is the cold mode after the gas turbine is started to generate steam from the exhaust heat recovery boiler.

In the control method, when the start mode of the steam turbine is the cold mode, the degree of opening of the intake air regulator is set to be greater than that in the different start mode. Accordingly, in the control method, in the cold mode, the temperature of the combustion gas in the gas turbine is lower and the temperature of steam is lower in comparison with the temperatures in the different start mode. As a result, in the control method, in the cold mode in which the temperature of the steam contact portion of the steam turbine is lower than the predetermined temperature, the temperature of steam is lower than that in the different start mode and it is thus possible to suppress a temperature difference between the temperature of steam and the temperature of the steam contact portion.

In the control method, opening control in the cold mode and opening control in the different start mode are performed using the first degree of opening and the second degree of opening appropriately. Accordingly, in the control method, it is possible to control the degree of opening of the intake air regulator before the supplying of steam to the steam turbine is started using a simple method.

Here, in the control method, the command output step may include outputting a command corresponding to the second degree of opening in the different start mode to the intake air regulator when it is recognized in the start mode-recognizing step that the start mode is the different start mode in the steam turbine pre-start period.

In any one of the above-described control methods, the command output step may include outputting a command indicating a degree of opening which gradually varies to a third degree of opening on the condition that the supplying of steam to the steam turbine is started after the command corresponding to the first degree of opening is output, and outputting a command indicating the third degree of opening after the degree of opening becomes the third degree of opening.

In the control method in which the command indicating the third degree of opening is output, the command output step may include outputting the command corresponding to the third degree of opening on the condition that the supplying of steam to the steam turbine is started after the command corresponding to the second degree of opening is output, and the third degree of opening immediately after the supplying of steam to the steam turbine is started may be the same degree of opening as the second degree of opening immediately before the supplying of steam is started.

In any one of the above-described control methods in which the third degree of opening is output, the third degree of opening corresponding to an output of the gas turbine at the present moment may be determined using a predetermined relationship between the output of the gas turbine and the third degree of opening.

In order to achieve the above-mentioned object, the second aspect of the present invention provides any one of the above-described control methods further including a stop mode-recognizing step of recognizing whether a stop mode at the time of stop of the steam turbine is a cooling stop mode in which the temperature of the steam contact portion at the time of stop of the steam turbine is lower than a predetermined temperature or a different stop mode in which the temperature of the steam contact portion is equal to or higher than the predetermined temperature, and the command output step may include outputting a command corresponding to a fourth degree of opening greater than a fifth degree of opening in the different stop mode to the intake air regulator as the command indicating the degree of opening of the intake air regulator when it is recognized in the stop mode-recognizing step that the stop mode is the cooling stop mode in the course of stopping the steam turbine along with the gas turbine.

In the control method, when the stop mode of the steam turbine is the cooling stop mode, the degree of opening of the intake air regulator is set to be greater than that in the different stop mode. Accordingly, in the control method, in the cooling stop mode, the temperature of the combustion gas is lower and the temperature of steam is lower in comparison with the temperatures in the different stop mode. As a result, in the control method, when the cooling stop mode is selected as the stop mode of the steam turbine, the temperature of steam is lower than that in the different stop mode and it is thus possible to lower the temperature of the steam turbine in a short time.

In the control method, opening control in the cooling stop mode and opening control in the different stop mode are performed using the fourth degree of opening and the fifth degree of opening appropriately. Accordingly, in the control method, it is possible to control the degree of opening of the intake air regulator in the course of stopping the steam turbine using a simple method.

In the control method according to the second aspect, the combined cycle plant may include a steam flow control valve that controls a flow rate of the steam flowing in the steam turbine, the command output step may include outputting a command corresponding to the fourth degree of opening on the condition that it is recognized in the stop mode-recognizing step that the stop mode is the cooling stop mode and the closing of the steam flow control valve is started in the course of stopping the steam turbine along with the gas turbine, and outputting a command corresponding to the fifth degree of opening on the condition that it is recognized in the stop mode-recognizing step that the stop mode is the different stop mode and the closing of the steam flow control valve is started in the course of stopping the steam turbine along with the gas turbine.

In the control method in which the command corresponding to the fifth degree of opening is output, the command output step may include outputting a command corresponding to a sixth degree of opening of which the degree of opening of the intake air regulator immediately before the closing of the steam flow control valve is started is the same as the fifth degree of opening at the time of start of the closing of the steam flow control valve, before the closing of the steam flow control valve is started in the course of stopping the steam turbine, and the command output step may include outputting a command indicating a degree of opening which gradually varies from the sixth degree of opening to the fourth degree of opening when it is recognized in the stop mode-recognizing step that the stop mode is the cooling stop mode and the closing of the steam flow control valve is started in the course of stopping the steam turbine, and outputting a command indicating the fourth degree of opening after the degree of opening becomes the fourth degree of opening.

In the control method in which the sixth degree of opening is output, the sixth degree of opening corresponding to the output of the gas turbine at the present moment may be determined using a predetermined relationship between the output of the gas turbine and the sixth degree of opening.

In the control method in which the sixth degree of opening is output, the predetermined relationship between the output of the gas turbine and the third degree of opening may be the same as the predetermined relationship between the output of the gas turbine and the sixth degree of opening, and the third degree of opening or the sixth degree of opening corresponding to the output of the gas turbine at the present moment may be determined using the predetermined relationship.

In any one of the above-described control methods, the start mode-recognizing step may include recognizing whether the start mode is the cold mode or the different start mode depending on the temperature of the steam contact portion of the steam turbine which is detected using a thermometer.

In order to achieve the second object, the third aspect of the present invention provides a control method of a combined cycle plant including a gas turbine that is driven by combustion gas, an exhaust heat recovery boiler that generates steam by heat of the combustion gas discharged from the gas turbine, and a steam turbine that is driven by the steam, in which the gas turbine includes an intake air regulator that regulates an amount of intake air, the control method including: a stop mode-recognizing step of recognizing whether a stop mode at the time of stop of the steam turbine is a cooling stop mode in which a temperature of a steam contact portion at the time of stop of the steam turbine is lower than a predetermined temperature or a different stop mode in which the temperature of the steam contact portion is equal to or higher than the predetermined temperature; and a command output step of outputting a command corresponding to a first degree of opening greater than a second degree of opening in the different stop mode to the intake air regulator as a command indicating a degree of opening of the intake air regulator when it is recognized in the stop mode-recognizing step that the stop mode is the cooling stop mode in the course of stopping the steam turbine along with the gas turbine.

In the control method, when the stop mode of the steam turbine is the cooling stop mode, the degree of opening of the intake air regulator is set to be greater than that in the different stop mode. Accordingly, in the control method, in the cooling stop mode, the temperature of the combustion gas is lower and the temperature of steam is lower in comparison with the temperatures in the different stop mode. As a result, in the control method, when the cooling stop mode is selected as the stop mode of the steam turbine, the temperature of steam is lower than that in the different stop mode and it is thus possible to lower the temperature of the steam turbine in a short time.

In the control method, opening control in the cooling stop mode and opening control in the different stop mode are performed using the first degree of opening and the second degree of opening appropriately. Accordingly, in the control method, it is possible to control the degree of opening of the intake air regulator in the course of stopping the steam turbine using a simple method.

Here, in the control method according to the third aspect, the combined cycle plant may include a steam flow control valve that controls a flow rate of the steam flowing in the steam turbine, and the command output step may include outputting a command corresponding to the first degree of opening on the condition that it is recognized in the stop mode-recognizing step that the stop mode is the cooling stop mode and the closing of the steam flow control valve is started in the course of stopping the steam turbine along with the gas turbine, and outputting a command corresponding to the second degree of opening on the condition that it is recognized in the stop mode-recognizing step that the stop mode is the different stop mode and the closing of the steam flow control valve is started in the course of stopping the steam turbine along with the gas turbine.

In the control method in which the command corresponding to the second degree of opening is output, the command output step may include outputting a command corresponding to a third degree of opening of which the degree of opening of the intake air regulator immediately before the closing of the steam flow control valve is started is the same as the second degree of opening at the time of start of the closing of the steam flow control valve, before the closing of the steam flow control valve is started in the course of stopping the steam turbine, and the command output step may include outputting a command indicating a degree of opening which gradually varies from the third degree of opening to the first degree of opening when it is recognized in the stop mode-recognizing step that the stop mode is the cooling stop mode and the closing of the steam flow control valve is started in the course of stopping the steam turbine, and outputting a command indicating the first degree of opening after the degree of opening becomes the first degree of opening.

Advantageous Effects of Invention

According to one aspect of the present invention, it is possible to suppress a temperature difference between a temperature of a steam contact portion of a steam turbine and a temperature of steam flowing therein at the time of start by simple control. According to another aspect of the present invention, it is possible to lower the temperature of the steam contact portion in a short time at the time of stop of the steam turbine.

DESCRIPTION OF EMBODIMENTS

Hereinafter, a combined cycle plant according to an embodiment of the present invention will be described in detail with reference to the accompanying drawings.

Figure 1:
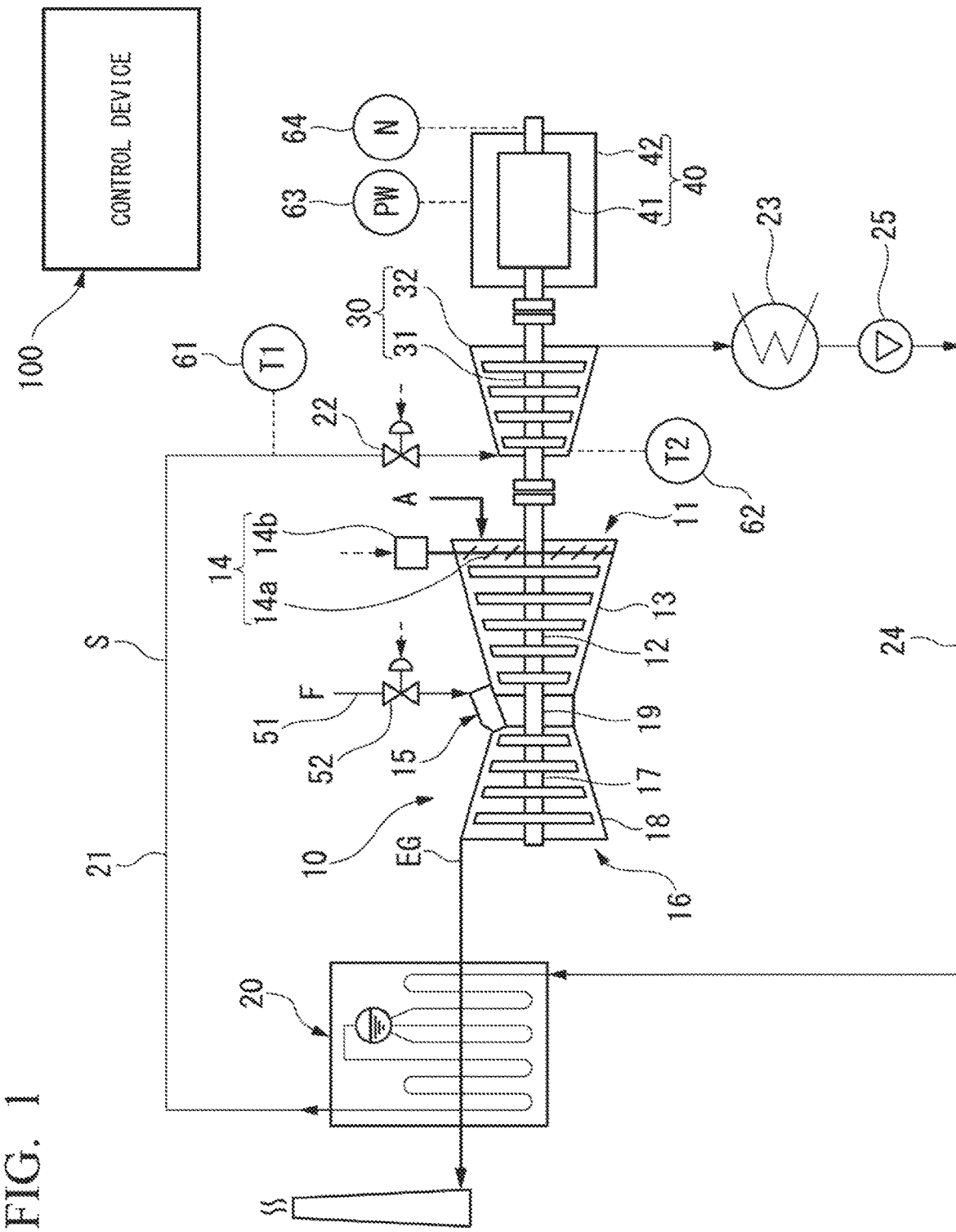
FIG. 1 is a system diagram of a combined cycle plant according to an embodiment of the present invention.

As illustrated in FIG. 1, a combined cycle plant according to this embodiment includes a gas turbine 10, an exhaust heat recovery boiler 20 that generates steam using heat of combustion gas discharged from the gas turbine 10, a steam turbine 30 that is driven by steam S from the exhaust heat recovery boiler 20, a power generator 40 that generates power by being driven by the turbines 10 and 30, a condenser 23 that returns steam discharged from the steam turbine 30 to water, a feed pump 25 that sends water from the condenser 23 to the exhaust heat recovery boiler 20, and a control device 100 that controls these units.

The gas turbine 10 includes a compressor 11 that compresses external air A to generate compressed air, a combustor 15 that mixes the compressed air with fuel F and combusts the mixed gas to generate high-temperature combustion gas, and a turbine 16 that is driven by the combustion gas.

The compressor 11 includes a compressor rotor 12 that rotates about an axis, a compressor casing 13 that rotatably covers the compressor rotor 12, and an intake air regulator 14 that regulates a flow rate of air suctioned into the compressor casing 13. The intake air regulator 14 includes an inlet guide vane (IGV) 14a that is disposed in an inlet of the compressor casing 13 and an actuator 14b that drives the IGV 14a to adjust a degree of opening of the IGV 14a.

The turbine 16 includes a turbine rotor 17 that rotates about an axis due to the combustion gas from the combustor 15 and a turbine casing 18 that rotatably covers the turbine rotor 17. The turbine rotor 17 and the compressor rotor 12 rotate about the same axis and are connected to each other to constitute a gas turbine rotor 19. An exhaust port of the turbine 16 is connected to the exhaust heat recovery boiler 20. Accordingly, exhaust gas EG which is combustion gas discharged from the turbine 16 is guided to the exhaust heat recovery boiler 20.

The steam turbine 30 includes a steam turbine rotor 31 that rotates about an axis and a steam turbine casing 32 that rotatably covers the steam turbine rotor 31.

As a start mode at the time of start of the steam turbine 30, for example, a cold mode in which a temperature T2 of a steam contact portion (for example, a first-stage vane ring) on a steam inlet side in the steam turbine casing 32 immediately before steam is injected into the steam turbine 30 is lower than a predetermined first temperature (for example, 300° C.), a warm mode in which the temperature of the steam contact portion is equal to or higher than the first temperature and lower than a predetermined second temperature (for example, 400° C.), and a hot mode in which the temperature of the steam contact portion is equal to or higher than the second temperature are included. In the following description, the start modes including the warm mode and the hot mode are referred to as a normal start mode. As a stop mode at the time of stop of the steam turbine 30, a cooling stop mode in which the temperature T2 of the steam contact portion in the steam turbine casing 32 at the time of stop of the steam turbine 30 is lower than a predetermined fourth temperature (for example, 150° C.) and a normal stop mode in which the temperature of the steam contact portion is equal to or higher than the fourth temperature are included.

The power generator 40 includes a power generator rotor 41 that rotates about an axis and a power generator casing 42 that rotatably covers the power generator rotor 41. The power generator casing 42 includes a stator that is disposed to face the outer circumference of the power generator rotor 41.

The gas turbine rotor 19, the steam turbine rotor 31, and the power generator rotor 41 are arranged on the same axis, are connected to each other, and rotate as a unified body. The combined cycle plant according to this embodiment is a single-shaft combined cycle plant. The combined cycle plant according to this embodiment is of a single-shaft type, but the present invention is not limited thereto.

The combustor 15 of the gas turbine 10 is connected to a fuel line 51 that supplies the fuel F from a fuel source to the combustor 15. The fuel line 51 is provided with a fuel flow control valve 52 that controls a flow rate of the fuel F flowing into the combustor 15.

A steam outlet of the steam turbine 30 is provided with the condenser 23. The condenser 23 and a feed port of the exhaust heat recovery boiler 20 are connected to each other via a feed line 24. The feed line 24 is provided with the above-mentioned feed pump 25. A steam outlet of the exhaust heat recovery boiler 20 and a steam inlet of the steam turbine 30 are connected to each other via a steam line 21. The steam line 21 is provided with a steam flow control valve 22 that controls a flow rate of the steam S flowing into the steam turbine 30.

A steam thermometer 61 that detects a temperature T1 of the steam S passing through the steam line 21 is disposed upstream (on the exhaust heat recovery boiler 20 side) from the steam flow control valve 22 in the steam line 21. A metal thermometer 62 that detects the temperature T2 of the steam contact portion (for example, the first-stage vane ring) of the steam turbine casing 32 is disposed on the steam inlet side of the steam turbine casing 32. The power generator 40 is provided with an output meter 63 that detects an amount of power generated in the power generator 40, that is, an output PW of the combined cycle plant. Any one of the power generator rotor 41, the steam turbine rotor 31, and the gas turbine rotor 19 is provided with a rotational speed meter 64 that detects a rotational speed N of the rotor.

Figure 2:
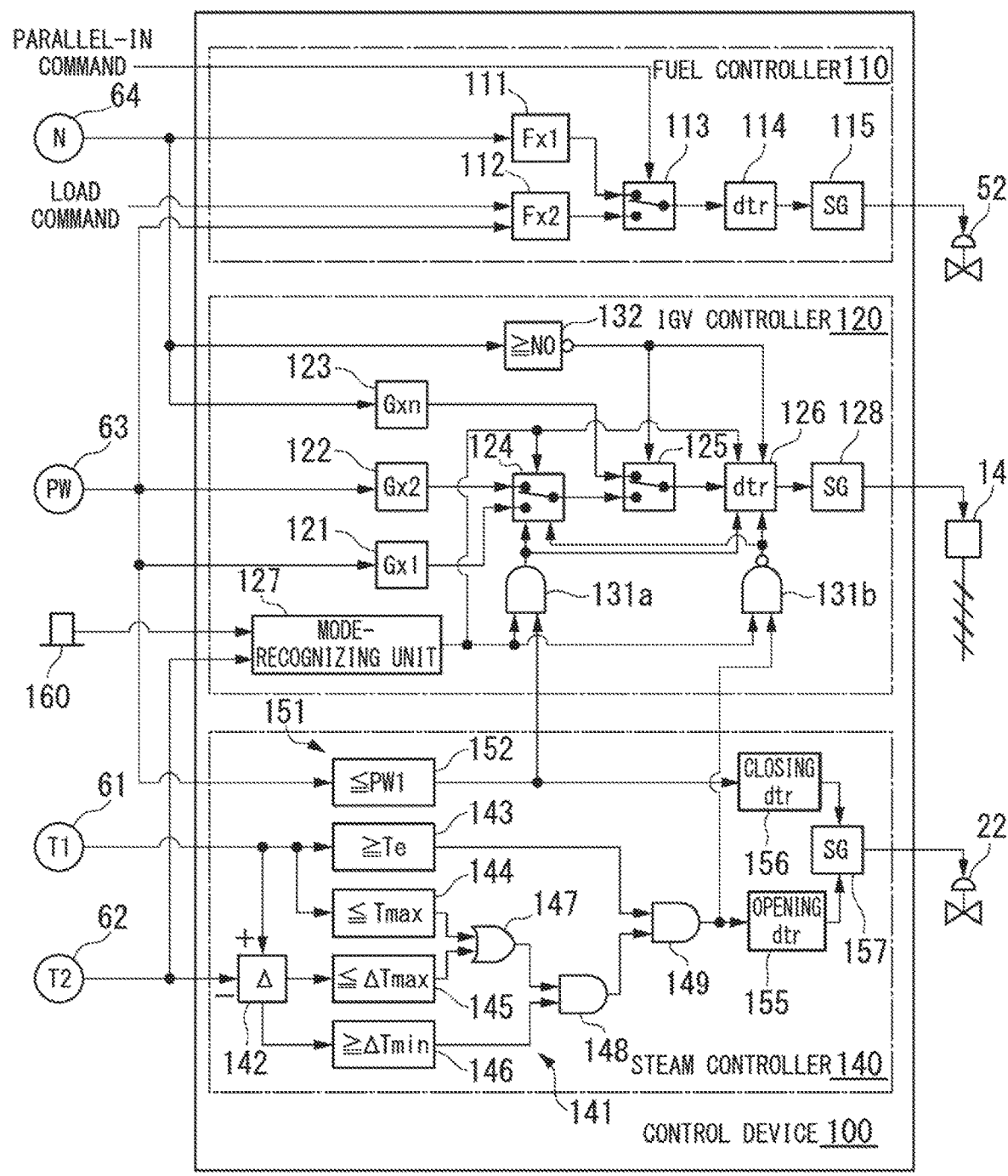
FIG. 2 is a functional block diagram of a control device according to an embodiment of the present invention.

As illustrated in FIG. 2, the control device 100 includes a fuel controller 110 that controls a degree of opening of the fuel flow control valve 52, an IGV controller 120 that controls a degree of opening of the intake air regulator 14, a steam controller 140 that controls a degree of opening of the steam flow control valve 22, and a stop mode receiver 160 that receives information as to whether the stop mode of the steam turbine 30 should be set to the cooling stop mode.

The fuel controller 110 includes a first fuel flow rate generator 111 that generates a fuel flow rate corresponding to the rotational speed N detected by the rotational speed meter 64, a second fuel flow rate generator 112 that generates a fuel flow rate corresponding to a load command from the outside and the output PW detected by the output meter 63, a fuel flow rate switch 113 that selectively outputs one of the fuel flow rate generated from the first fuel flow rate generator 111 and the fuel flow rate generated from the second fuel flow rate generator 112, a limiter 114 that limits a fuel flow variation rate which is a variation of the fuel flow rate from the fuel flow rate switch 113 per unit time, and a command output unit 115 that outputs a command indicating the degree of opening of the fuel flow control valve 52 corresponding to the fuel flow rate output from the limiter 114.

The first fuel flow rate generator 111 has a function Fx1 that determines a relationship between a predetermined rotational speed and a fuel flow rate at each time such that the rotational speed N of the gas turbine rotor 19 increases, for example, in a predetermined pattern. The first fuel flow rate generator 111 determines the fuel flow rate at which the predetermined rotational speed at the present moment is obtained using the function Fx1. When there is a difference between the rotational speed N detected by the rotational speed meter 64 and the predetermined rotational speed at the present moment, the first fuel flow rate generator 111 corrects the determined fuel flow rate and generates a corrected fuel flow rate. The second fuel flow rate generator 112 has a function Fx2 that determines a relationship between the output indicated by the load command from the outside and the output PW detected by the output meter 63 and the fuel flow rate. The second fuel flow rate generator 112 generates a fuel flow rate corresponding to the load command from the outside and the output PW detected by the output meter 63 using the function Fx2.

The fuel flow rate switch 113 outputs the fuel flow rate from the first fuel flow rate generator 111 until a parallel-in command is received from the outside after the gas turbine 10 is started. The fuel flow rate switch 113 outputs the fuel flow rate from the second fuel flow rate generator 112 when the parallel-in command is received from the outside. The limiter 114 limits the fuel flow variation rate of the fuel flow rate output from the fuel flow rate switch 113 to a predetermined value or less as described above. The command output unit 115 prepares a command indicating the degree of opening of the fuel flow control valve 52 corresponding to the fuel flow rate output from the limiter 114 and outputs the command to the fuel flow control valve 52.

The IGV controller 120 includes a first opening generator 121 that generates a desired first degree of opening G1 of the intake air regulator 14, a second opening generator 122 that generates a desired second degree of opening G2 of the intake air regulator 14, a gas turbine start opening generator 123 that generates a gas turbine start degree of opening Gn which is the degree of opening of the intake air regulator 14 at the time of start of the gas turbine, a first switch 124 that selectively outputs one degree of opening of the first degree of opening G1 and the second degree of opening G2, a second switch 125 that selectively outputs one degree of opening of the degree of opening output from the first switch 124 and the gas turbine start degree of opening Gn, and a limiter 126 that limits an opening variation rate which is a variation of the degree of opening output from the second switch 125 per unit time. The IGV controller 120 further includes a mode-recognizing unit 127 that recognizes a mode of the steam turbine 30, a command output unit 128 that outputs a command indicating the degree of opening output from the limiter 126 to the intake air regulator 14, first switch command generators 131a and 131b that output a switch command to the first switch 124, and a second switch command generator 132 that outputs a switch command to the second switch 125.

Figure 3:
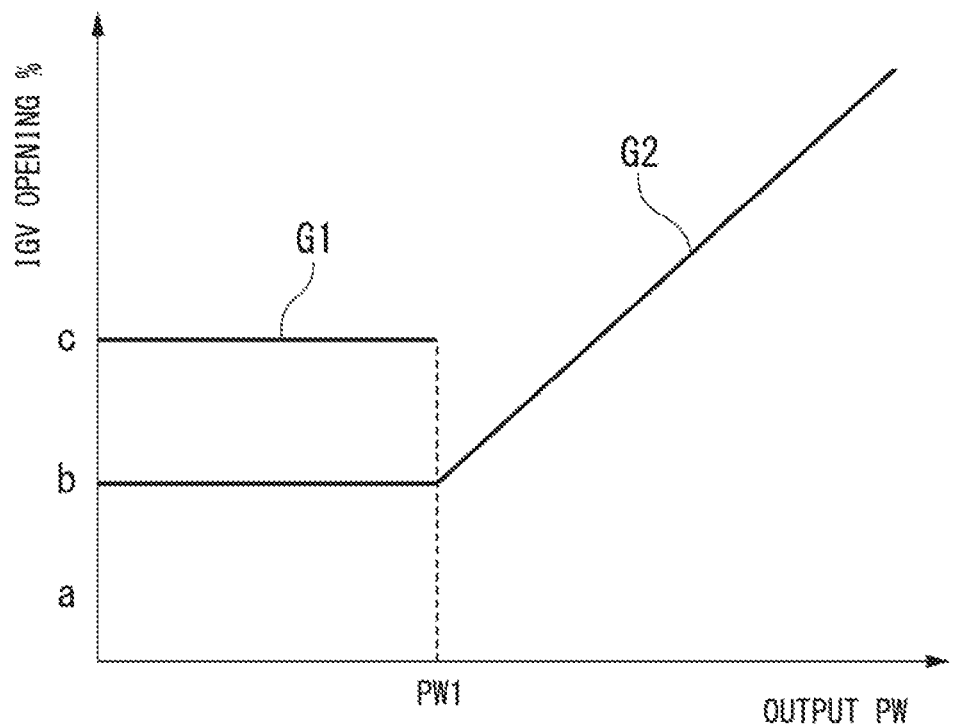
FIG. 3 is a diagram illustrating a function Gx1 of a first opening generator and a function Gx2 of a second opening generator according to an embodiment of the present invention.

The second opening generator 122 has a function Gx2 that determines a relationship between the output PW detected by the output meter 63 and the second degree of opening G2 of the intake air regulator 14. The function Gx2 indicates a constant degree of opening b as the second degree of opening G2 until the output PW detected by the output meter 63 reaches a predetermined output PW1 as illustrated in FIG. 3. The function Gx2 indicates a degree of opening having a positive correlation with a variation of the output PW as the second degree of opening G2 when the output PW detected by the output meter 63 becomes equal to or greater than the predetermined output PW1. The second opening generator 122 generates the second degree of opening G2 corresponding to the output detected by the output meter 63 using the function Gx2. The second opening generator 122 also serves as a third opening generator that generates a third degree of opening to be described later, a fifth opening generator that generates a fifth degree of opening to be described later, and a sixth opening generator that generates a sixth degree of opening to be described later. The second opening generator 122 generates a degree of opening corresponding to the output detected by the output meter 63 using the function Gx2 when serving as the third opening generator, when serving as the fifth opening generator, and when serving as the sixth opening generator.

The first opening generator 121 has a function Gx1 that determines a relationship between the output PW detected by the output meter 63 and the first degree of opening G1 of the intake air regulator 14. The function Gx1 indicates the first degree of opening G1 when the output PW detected by the output meter 63 is less than the power PW1 as illustrated in FIG. 3. The function Gx1 indicates a constant degree of opening c as the first degree of opening G1 when the output PW detected by the output meter 63 is from 0 to the output PW1. The degree of opening c is greater than the above-mentioned degree of opening b. The first opening generator 121 generates the first degree of opening G1 corresponding to the output detected by the output meter 63 using the function Gx1. The first opening generator 121 also serves as a fourth opening generator that generates a fourth degree of opening to be described later. The first opening generator 121 also generates a degree of opening using the function Gx1 when serving as the fourth opening generator.

Figure 4:
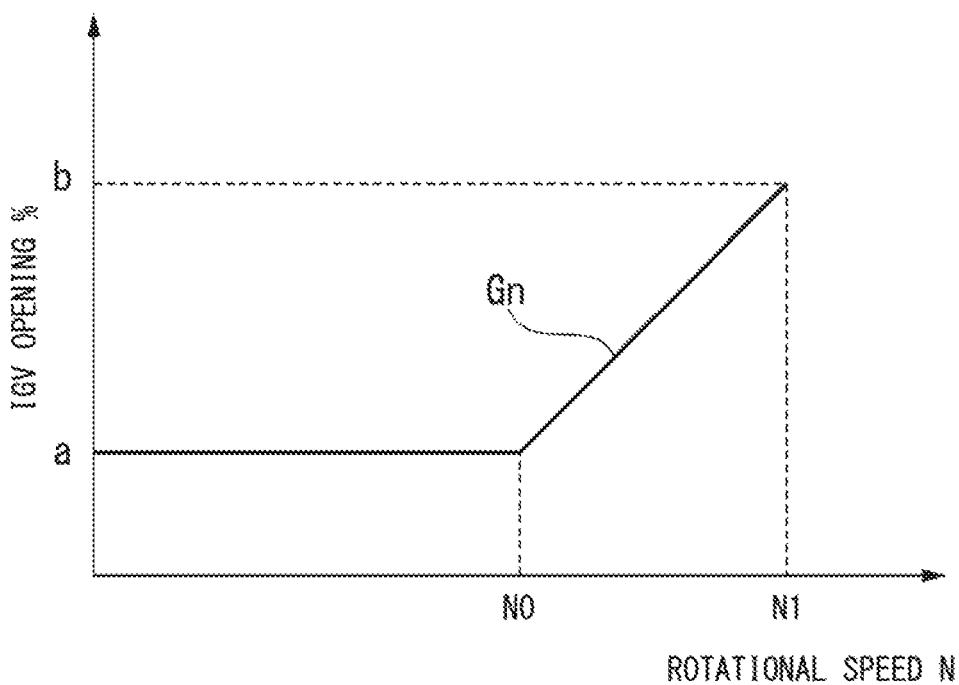
FIG. 4 is a diagram illustrating a function Gxn of a gas turbine start opening generator according to an embodiment of the present invention.

The gas turbine start opening generator 123 has a function Gxn that determines a relationship between the rotational speed N of the gas turbine 10 and the degree of opening of the intake air regulator 14 at the time of start. As illustrated in FIG. 4, the function Gxn indicates a degree of opening up to a rated rotational speed N1 of the gas turbine 10. The function Gxn indicates a constant degree of opening a until the rotational speed N detected by the rotational speed meter 64 reaches a predetermined rotational speed N0. The predetermined rotational speed N0 is a rotational speed lower than the rated rotational speed N1. When the rotational speed N detected by the rotational speed meter 64 becomes equal to or greater than the predetermined rotational speed N0, the function Gxn indicates a degree of opening having a positive correlation with a variation of the rotational speed N and gradually increasing from the degree of opening a with an increase in the rotational speed N. In the function Gxn, the degree of opening at which the rotational speed N detected by the rotational speed meter 64 is equal to the rated rotational speed N1 is the above-mentioned degree of opening b.

The mode-recognizing unit 127 recognizes whether the start mode of the steam turbine 30 is the cold mode or the normal start mode depending on the temperature T2 detected by the metal thermometer 62. Specifically, the mode-recognizing unit 127 recognizes the cold mode when the temperature T2 of the steam contact portion of the steam turbine casing 32 detected by the metal thermometer is lower than the first temperature (for example, 300° C.), and recognizes the normal start mode when the temperature of the steam contact portion is equal to or higher than the first temperature. The mode-recognizing unit 127 recognizes whether the stop mode of the steam turbine 30 is the cooling stop mode or the normal stop mode depending on an input operation of the stop mode receiver 160.

The first switch command generators 131a and 131b include the first a switch command generator 131a that issues a switch command "1" to the opening control in the cold mode and the opening control in the cooling stop mode and the first b switch command generator 131b that issues a switch command "0" for ending the opening control in the cold mode. The first a switch command generator 131a issues the switch command "1" to the opening control in the cold mode when the mode-recognizing unit 127 recognizes that the start mode is the cold mode. The first a switch command generator 131a issues a switch command "1" to the opening control in the cooling stop mode when the mode-recognizing unit 127 recognizes that the stop mode is the cooling stop mode and the output PW detected by the output meter 63 is equal to or less than the predetermined output PW1. The first b switch command generator 131b issues a switch command "0" for ending the opening control in the cold mode when the mode-recognizing unit 127 recognizes that the start mode is the cold mode and the steam flow control valve 22 is opened from the closed state.

The first switch 124 outputs the first degree of opening G1 of the first degree of opening G1 and the second degree of opening G2 when the first a switch command generator 131a issues the switch command "1" to the opening control in the cold mode and the opening control in the cooling stop mode.

The first switch 124 outputs the second degree of opening G2 of the first degree of opening G1 and the second degree of opening G2 when the first b switch command generator 131b issues the switch command "0" for ending the opening control in the cold mode.

The second switch command generator 132 issues a switch command "1" to the opening control at the time of start of the gas turbine when the rotational speed N detected by the rotational speed meter 64 is less than the rated rotational speed N1. The second switch 125 outputs the gas turbine start degree of opening Gn from the gas turbine start opening generator 123, of the gas turbine start degree of opening (in from the gas turbine start opening generator 123 and the degree of opening from the first switch 124, when the second switch command generator 132 issues the switch command "1" to the opening control at the time of start of the gas turbine. The second switch command generator 132 issues a switch command "0" for ending the opening control at the time of start of the gas turbine when the rotational speed N detected by the rotational speed meter 64 becomes equal to or higher than the rated rotational speed N1. The second switch 125 outputs the degree of opening from the first switch 124, of the gas turbine start degree of opening nm from the gas turbine start opening generator 123 and the degree of opening from the first switch 124, when the second switch command generator 132 issues the switch command "0" for ending the opening control at the time of start of the gas turbine.

The limiter 126 limits the variation rate of the degree of opening output from the second switch 125 to a predetermined variation rate or less as described above. The predetermined variation rate is changed depending on the state of the combined cycle plant.

As described above, the command output unit 128 outputs a command indicating the degree of opening of which the variation rate is limited by the limiter 126 to the intake air regulator 14.

The steam controller 140 includes an opening condition-determining unit 141 that determines whether an opening condition of the steam flow control valve 22 is satisfied, a closing condition-determining unit 151 that determines whether a closing condition of the steam flow control valve 22 is satisfied, an opening-opening generator 155 that generates a degree of opening in the course of opening the steam flow control valve 22, a closing-opening generator 156 that generates a degree of opening in the course of closing the steam flow control valve 22, and a command output unit 157 that outputs a command corresponding to the degree of opening generated by the opening-opening generator 155 or the degree of opening generated by the closing-opening generator 156 to the steam flow control valve 22.

The opening condition-determining unit 141 includes a subtractor 142, a first determiner 143, a second determiner 144, a third determiner 145, a fourth determiner 146, an OR circuit 147, a first AND circuit 148, and a second AND circuit 149.

The subtractor 142 calculates a temperature difference $\Delta T$ ($=T1-T2$) between the temperature T1 of the steam S in the steam line 21 detected by the steam thermometer 61 and the temperature T2 of the steam contact portion of the steam turbine casing 32 detected by the metal thermometer 62. When the temperature T1 of the steam S is equal to or higher than (saturation temperature at the present steam pressure+ specific degree of superheat) Te, the first determiner 143 determines that the temperature T1 of the steam S satisfies a lower limit for opening the steam flow control valve 22, and outputs "1." When the temperature T1 of the steam S is equal to or lower than a predetermined upper limit temperature Tmax, the second determiner 144 determines that the temperature T1 of the steam S satisfies an upper limit for opening the steam flow control valve 22, and outputs "1." When the temperature difference ΔT is equal to or less than a predetermined temperature difference ΔTmax, the third determiner 145 determines that the temperature difference ΔT satisfies an upper limit for opening the steam flow control valve 22, and outputs "1." When the temperature difference ΔT is equal to or greater than a predetermined temperature difference ΔTmin (where ΔTmin has a negative value), the fourth determiner 146 determines that the temperature difference ΔT satisfies a lower limit for opening the steam flow control valve 22, and outputs "1." When the second determiner 144 or the third determiner 145 outputs "1," the OR circuit 147 outputs "1." When the fourth determiner 146 outputs "1" and the OR circuit 147 outputs "1," the first AND circuit 148 outputs "1." When the first determiner 143 outputs "1" and the first AND circuit 148 outputs "1," the second AND circuit 149 outputs "1."

That is, when the following Temperature Conditions (1) and (2) are satisfied, the second AND circuit 149 of the opening condition-determining unit 141 determines that the opening condition of the steam flow control valve 22 is satisfied and outputs "1."

(1) Upper Limit of Temperature

The temperature T1 of the steam S is equal to or lower than the predetermined upper limit temperature Tmax or the temperature difference ΔT is equal to or less than the predetermined temperature difference ΔTmax.

(2) Lower Limit of Temperature

The temperature T1 of the steam S is equal to or higher than (saturation temperature at the present steam pressure+ specific degree of superheat) Te or the temperature difference ΔT is equal to or greater than the predetermined temperature difference ΔTmin (where ΔTmin has a negative value).

As described above, in this embodiment, as the opening condition of the steam flow control valve 22, that is, as a steam supply start condition of the steam turbine 30, the upper and lower limits of the temperature difference ΔT between the temperature T1 of the steam S in the steam line 21 and the temperature T2 of the steam contact portion of the steam turbine casing 32 are determined. This is to suppress generation of thermal stress in the steam turbine 30 at the time of start of the supply of steam to the steam turbine 30.

The opening-opening generator 155 generates a degree of opening which increases at a predetermined variation rate when "1" is output from the opening condition-determining unit 141. The variation rate may be changed depending on various conditions.

The closing condition-determining unit 151 includes a fifth determiner 152. When the output PW detected by the output meter 63 becomes equal to or less than the predetermined output PW1 after a load command indicating stopping of the combined cycle plant is input from the outside, the fifth determiner 152 determines that the closing condition of the steam flow control valve 22 is satisfied and outputs "1."

The closing-opening generator 156 generates a degree of opening which decreases at a predetermined variation rate when "1" is output from the closing condition-determining unit 151. This variation rate may be changed depending on various conditions. For example, the variation rate may be increased when the stop mode is the normal stop mode, and may be decreased when the stop mode is the cooling stop mode.

As described above, the command output unit 157 outputs a command corresponding to the degree of opening generated by the opening-opening generator 155 or the degree of opening generated by the closing-opening generator 156 to the steam flow control valve 22.

The control device 100 according to this embodiment is constituted by a computer, and processes of the units of the control device 100 are embodied by an external storage device, such as a hard disk drive device, or a storage device, such as a memory, and a CPU for executing a program stored in the storage device.

Figure 5:
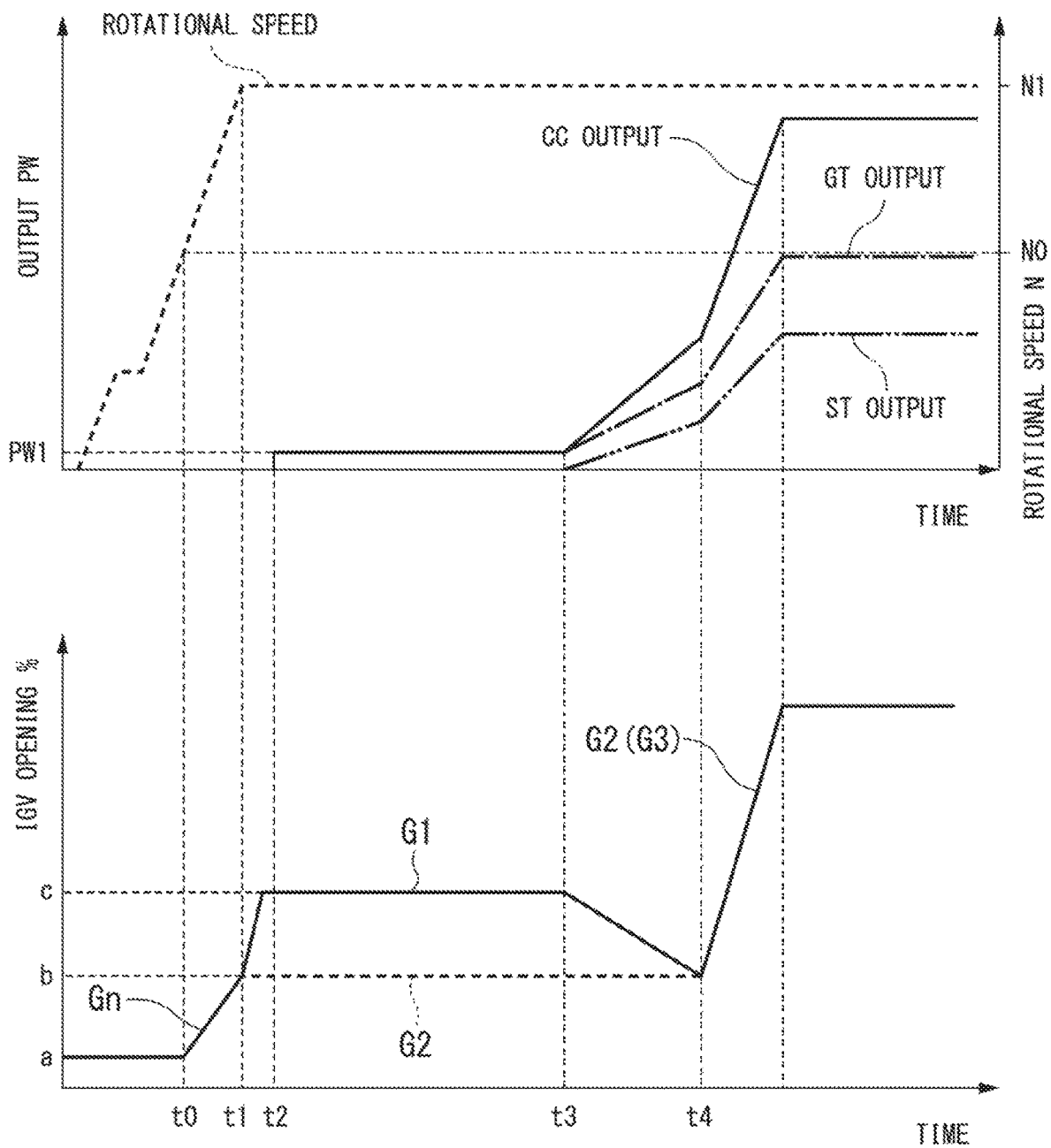
FIG. 5 is a timing chart illustrating operations in the course of starting a combined cycle plant according to an embodiment of the present invention.

The operation in the course of starting the combined cycle plant according to this embodiment will be described below with reference to the timing chart illustrated in FIG. 5.

When a load command indicating start of the combined cycle plant is received from the outside, the control device 100 outputs a start command to a starting device which is not illustrated and starts the starting device. With the starting of the starting device, the compressor rotor 12 and the turbine rotor 17 of the gas turbine 10 start rotation as a unified body. When the compressor rotor 12 rotates, compressed air from the compressor 11 is supplied to the combustor 15. When the compressor rotor 12 and the turbine rotor 17, that is, the gas turbine rotor 19, reaches, for example, the predetermined rotational speed N0 (t0), the fuel controller 110 of the control device 100 outputs an opening command to the fuel flow control valve 52. As a result, the fuel F from the fuel line 51 is supplied to the combustor 15 via the fuel flow control valve 52. The fuel F is combusted in the compressed air supplied from the compressor 11 to the combustor 15. The combustion gas generated from the combustor 15 flows into the turbine 16 to cause the gas turbine rotor 19 to rotate.

When the supplying of fuel to the combustor 15 is started, a fuel flow rate from the first fuel flow rate generator 111 of the fuel controller 110 is sent to the limiter 114 via the fuel flow rate switch 113. As described above, the first fuel flow rate generator ill determines the fuel flow rate at which the predetermined rotational speed at the present moment is obtained using the function Fx1. When there is a difference between the rotational speed N detected by the rotational speed meter 64 and the predetermined rotational speed at the present moment, the first fuel flow rate generator 111 corrects the determined fuel flow rate and generates a corrected fuel flow rate. The limiter 114 limits the variation rate of the fuel flow rate from the first fuel flow rate generator 111 such that the variation rate of the fuel flow rate is equal to or less than a predetermined variation rate, and outputs the fuel flow rate limited in variation rate. The command output unit 115 outputs a command indicating the degree of opening corresponding to the fuel flow rate output from the limiter 114 to the fuel flow control valve 52.

As a result, the rotational speed N of the gas turbine rotor 19 basically increases in a predetermined pattern.

The second switch command generator 132 of the IGV controller 120 issues a switch command "1" when the rotational speed N detected by the rotational speed meter 64 is less than the rated rotational speed N1. The second switch 125 of the IGV controller 120 receives the switch command "1" and sends the degree of opening from the gas turbine start opening generator 123, of the degree of opening from the gas turbine start opening generator 123 and the degree of opening from the first switch 124, to the limiter 126. Accordingly, when the supplying of fuel to the combustor 15 is started, that is, when the rotational speed N detected by the rotational speed meter 64 is less than the rated rotational speed N1, the degree of opening from the gas turbine start opening generator 123 of the IGV controller 120 is sent to the limiter 126 via the second switch 125. The gas turbine start opening generator 123 generates the degree of opening corresponding to the rotational speed N detected by the rotational speed meter 64 as the gas turbine start degree of opening Gn using the function Gxn. The degree of opening generated by the gas turbine start opening generator 123 is the constant degree of opening a until the rotational speed N detected by the rotational speed meter 64 reaches the predetermined rotational speed N0 (t0) as described above with reference to FIG. 4. The degree of opening generated by the gas turbine start opening generator 123 varies with a positive correlation with the variation of the rotational speed N when the rotational speed N detected by the rotational speed meter 64 becomes equal to or greater than the predetermined output N0 (t0). That is, the degree of opening generated by the gas turbine start opening generator 123 increases with the increase in the rotational speed N. The limiter 126 limits the variation rate of the degree of opening from the gas turbine start opening generator 123 such that the variation rate of the degree of opening of the intake air regulator 14 becomes equal to or less than a predetermined variation rate, and outputs the degree of opening limited in variation rate. The command output unit 128 outputs a command indicating the degree of opening output from the limiter 126 to the intake air regulator 14. The degree of opening of the intake air regulator 14 becomes the degree of opening b immediately before the rotational speed N of the gas turbine rotor 19 reaches the rated rotational speed N1.

The mode-recognizing unit 127 of the IGV controller 120 recognizes whether the start mode of the steam turbine 30 is the cold mode or the normal start mode depending on the temperature T2 of the steam turbine casing 32 detected by the metal thermometer 62 (start mode-recognizing step). The first a switch command generator 131a issues the switch command "0" to the opening control in the normal start mode when the mode-recognizing unit 127 recognizes that the start mode is the normal start mode. When the switch command "0" is received from the first a switch command generator 131a, the first switch 124 outputs the second degree of opening G2 from the second opening generator 122 of the first degree of opening G1 from the first opening generator 121 and the second degree of opening G2 from the second opening generator 122. As described above with reference to FIG. 3, the second degree of opening G2 is the constant degree of opening b until the output PW detected by the output meter 63 reaches the predetermined output PW1, and is the degree of opening having a positive correlation with the variation of the output PW when the output PW detected by the output meter 63 becomes equal to or greater than the predetermined output PW1.

The rotational speed N of the gas turbine rotor 19 becomes the rated rotational speed N1 (t1) before the output PW detected by the output meter 63 becomes equal to or greater than the predetermined output PW1. When the rotational speed N detected by the rotational speed meter 64 becomes equal to or greater than the rated rotational speed N1 (t1), the second switch command generator 132 issues the switch command "0." When the switch command "0" is received, the second switch 125 sends the degree of opening from the first switch 124 of the degree of opening from the gas turbine start opening generator 123 and the degree of opening from the first switch 124, that is, the first degree of opening G1 generated by the first opening generator 121 or the second degree of opening G2 generated by the second opening generator 122, to the limiter 126. In this case (in the normal start mode), the second switch 125 sends the second degree of opening G2 generated by the second opening generator 122 to the limiter 126. The limiter 126 limits the variation rate of the degree of opening from the second opening generator 122 such that the variation rate of the degree of opening of the intake air regulator 14 becomes equal to or less than a predetermined variation rate, and outputs the degree of opening limited in variation rate. The command output unit 128 outputs a command indicating the degree of opening output from the limiter 126 to the intake air regulator 14 (command output step).

When the mode-recognizing unit 127 recognizes that the start mode is the cold mode, the first a switch command generator 131a issues the switch command "1" to the opening control in the cold mode. When the switch command "1" is received from the first a switch command generator 131a, the first switch 124 outputs the first degree of opening G1 from the first opening generator 121 of the first degree of opening G1 from the first opening generator 121 and the second degree of opening G2 from the second opening generator 122. As described above with reference to FIG. 3, the first degree of opening G1 is the constant degree of opening c greater than the degree of opening b in the normal start mode.

As described above, when the rotational speed N detected by the rotational speed meter 64 becomes equal to or greater than the rated rotational speed N1 (t1), the second switch command generator 132 issues the switch command "0." When the switch command "0" is received, the second switch 125 sends the degree of opening from the first switch 124 of the degree of opening from the gas turbine start opening generator 123 and the degree of opening from the first switch 124, that is, the first degree of opening G1 generated by the first opening generator 121 or the second degree of opening G2 generated by the second opening generator 122, to the limiter 126. In this case (in the cold mode), the second switch 125 sends the degree of opening c which is the first degree of opening G1 generated by the first opening generator 121 to the limiter 126. The degree of opening immediately before the switching of the second switch 125 is the degree of opening b which is the gas turbine start degree of opening Gn when the gas turbine rotor 19 rotates at the rated rotational speed N1. On the other hand, the degree of opening immediately after the switching of the second switch 125 is the degree of opening c which is the first degree of opening G1 greater than the degree of opening b. The limiter 126 limits the variation rate of the degree of opening from the second opening generator 122 such that the variation rate of the degree of opening of the intake air regulator 14 becomes equal to or less than a predetermined variation rate. That is, the limiter 126 limits the variation rate of the degree of opening from the second opening generator 122 such that the degree of opening gradually increases from the degree of opening b before the switching of the second switch 125 to the degree of opening c. When the degree of opening to be output becomes the degree of opening c, the limiter 126 continuously outputs the degree of opening c. The command output unit 128 outputs a command indicating the degree of opening output from the limiter 126 to the intake air regulator 14 (command output step).

When the rotational speed N of the gas turbine rotor 19 reaches the rated rotational speed N1 and a predetermined condition is satisfied, a parallel-in command ordering electrical connection between the power generator 40 and an external system power line is input to the control device 100 from the outside (t2). When the parallel-in command is input (t2), a breaker is closed and the power generator 40 and the external system power line are electrically connected to each other. As a result, from this time (t2) on, the output PW from the output meter 63 can be acquired. When the power generator 40 is connected to the system power line, the rotational speed of the gas turbine rotor 19 is then kept at the rated rotational speed N1. When the parallel-in command is received, the fuel flow rate switch 113 of the fuel controller 110 outputs the fuel flow rate from the second fuel flow rate generator 112 of the fuel flow rate from the first fuel flow rate generator 111 and the fuel flow rate from the second fuel flow rate generator 112. The second fuel flow rate generator 112 generates the fuel flow rate corresponding to the load command from the outside, the output PW detected by the output meter 63, and the like using the function Fx2 as described above. The fuel flow rate from the second fuel flow rate generator 112 is sent to the limiter 114 via the fuel flow rate switch 113. As described above, the limiter 114 limits the fuel flow variation rate of the fuel flow rate output from the fuel flow rate switch 113 to a predetermined value or less. The command output unit 115 prepares a command indicating the degree of opening based on the fuel flow rate output from the limiter 114 and outputs the command to the fuel flow control valve 52.

The load command from the outside is basically constant until the steam supply start condition of the steam turbine 30 is satisfied. Accordingly, the degree of opening of the fuel flow control valve 52 is constant until the steam supply start condition of the steam turbine 30 is satisfied after the parallel-in, and the output PW during that time is kept at the constant output PW1. Regarding the load command from the outside, when the steam supply start condition of the steam turbine 30 is satisfied (t3), a load value indicated by the load command gradually increases. Accordingly, when the steam supply start condition of the steam turbine 30 is satisfied (t3), the degree of opening of the fuel flow control valve 52 gradually increases and the output PW also gradually increases. Thereafter, until the gas turbine 10 is stopped, the fuel flow control valve 52 is controlled to the degree of opening corresponding to the fuel flow rate from the second fuel flow rate generator 112.

When the supplying of fuel to the combustor 15 of the gas turbine 10 is started, the flow rate of steam generated from the exhaust heat recovery boiler 20 gradually increases and the temperature of steam gradually increases. Then, when the power generator 40 is paralleled in, the steam supply start condition of the steam turbine 30 is satisfied.

When the steam supply start condition is satisfied, "1" is output from the opening condition-determining unit 141 of the steam controller 140 (t3). When "1" is output from the opening condition-determining unit 141, the opening-opening generator 155 generates the degree of opening which increases at a predetermined variation rate. The command output unit 157 of the steam controller 140 outputs the command indicating the degree of opening to the steam flow control valve 22. As a result, the opening of the steam flow control valve 22 in the closed state is gradually started, the supply of steam to the steam turbine 30 is started, and the output of the steam turbine 30 starts to add to the output detected by the output meter 63.

When the mode-recognizing unit 127 recognizes that the start mode is the cold mode and the opening condition-determining unit 141 of the steam controller 140 determines that the steam supply start condition is satisfied and outputs "1" (t3), the first b switch command generator 131b of the IGV controller 120 issues the switch command "0" for ending the opening control in the cold mode. When the switch command "0" is received from the first b switch command generator 131b, the first switch 124 outputs the second degree of opening G2 from the second opening generator 122 of the first degree of opening G1 from the first opening generator 121 and the second degree of opening G2 from the second opening generator 122. At this time, the first switch 124 serves as a third switch. The second degree of opening G2 is sent to the limiter 126 via the second switch 125. The degree of opening immediately before the switching of the first switch (the third switch) 124 is the degree of opening c which is the first degree of opening G1. On the other hand, the degree of opening immediately after the switching of the first switch (the third switch) 124 is the degree of opening b which is the second degree of opening G2 generated by the second opening generator 122. The limiter 126 limits the variation rate of the degree of opening from the second opening generator 122 such that the variation rate of the degree of opening of the intake air regulator 14 becomes equal to or less than a predetermined variation rate. That is, the limiter 126 limits the variation rate of the degree of opening from the second opening generator 122 such that the degree of opening gradually decreases from the degree of opening c before the switching of the second switch 125 to the degree of opening b. At this time, the variation rate of the degree of opening may be different from the variation rate of the degree of opening when the rotational speed N detected by the rotational speed meter 64 becomes equal to or greater than the rated rotational speed N1 (t1) and the degree of opening is switched from the degree of opening b to the degree of opening c. In this case, the limiter 126 receives the switch command "0" from the first b switch command generator 131b and changes the variation rate of the degree of opening. Thereafter, until the control for stopping the steam turbine 30 along with the gas turbine 10 is started, the degree of opening of the intake air regulator 14 is controlled to the second degree of opening G2 generated by the second opening generator 122. Immediately after the switching of the first switch 124, the second opening generator 122 serves as the third opening generator. When serving as the third opening generator, the second opening generator 122 outputs the second degree of opening G2 as a third degree of opening G3.

As described above, in this embodiment, the upper and lower limits of the temperature difference ΔT between the temperature T1 of the steam S in the steam line 21 and the temperature T2 of the steam contact portion of the steam turbine casing 32 are determined as the opening condition of the steam flow control valve 22, that is, as the steam supply start condition of the steam turbine 30. With a recent increase in efficiency of the gas turbine 10, the temperature of combustion gas in the turbine 16 of the gas turbine 10 increases and thus the temperature of steam also increases. Accordingly, in the cold mode in which the temperature T2 of the steam contact portion of the steam turbine casing 32 is lower than a predetermined temperature (for example, 300° C.), the temperature difference ΔT between the temperature T1 of the steam S in the steam line 21 and the temperature T2 of the steam contact portion of the steam turbine casing 32 increases. Accordingly, there is a high possibility that the temperature difference ΔT will not be within the range of the upper and lower limits which is one steam supply start condition.

Therefore, in this embodiment, when the start mode of the steam turbine 30 is the cold mode, the degree of opening of the intake air regulator 14 is set to be greater than in the normal start mode. In this embodiment, the flow rate control of fuel to be supplied to the combustor 15 of the gas turbine 10 is the same in the cold mode and in the normal start mode. Accordingly, in this embodiment, an air flow rate relative to the fuel flow rate supplied to the gas turbine 10 is greater in the cold mode than in the normal start mode. As a result, in this embodiment, the temperature of combustion gas is lower and the temperature of steam is also lower in the cold mode than in the normal start mode. In this embodiment, in the cold mode in which the temperature T2 of the steam contact portion of the steam turbine casing 32 is lower than the predetermined temperature, the temperature of steam is also lower than in the normal start mode, and it is thus possible to suppress the temperature difference ΔT between the temperature T1 of the steam S and the temperature T2 of the steam contact portion.

Therefore, in this embodiment, it is possible to easily satisfy the steam supply start condition even in the cold mode.

In this embodiment, the opening control in the cold mode and the opening control in the normal start mode are performed using the first degree of opening G1 from the first opening generator 121 and the second degree of opening G2 from the second opening generator 122 appropriately. Accordingly, in this embodiment, it is possible to control the degree of opening of the intake air regulator 14 before the supplying of steam to the steam turbine 30 is started using a simple method. In other words, in this embodiment, it is possible to simplify the configuration of the IGV controller 120 that controls the degree of opening of the intake air regulator 14 before the supplying of steam to the steam turbine 30 is started.

In this embodiment, even when there is a difference between one degree of opening and another degree of opening at the time of switching one of the degrees of opening generated from the opening generators to another, the degree of opening gradually varies from one degree of opening to another degree of opening and it is thus possible to suppress disorder of a control system at the time of switching the degree of opening. Accordingly, in this embodiment, it is possible to suppress disorder of the control system even using the first degree of opening G1 from the first opening generator 121 and the second degree of opening G2 from the second opening generator 122 appropriately as described above.

Figure 6:
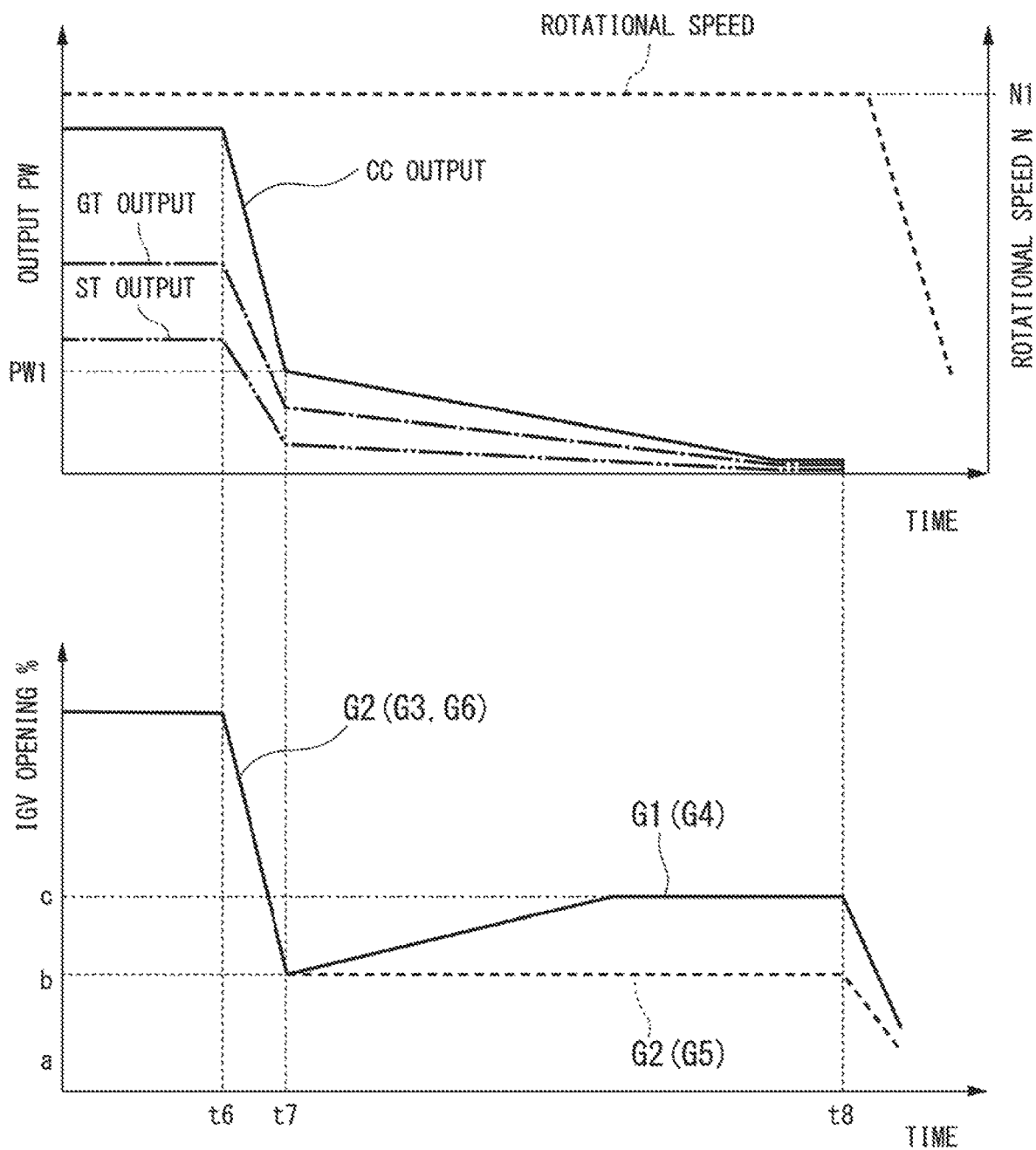
FIG. 6 is a timing chart illustrating operations in the course of stopping a combined cycle plant according to an embodiment of the present invention.

The operation in the course of stopping the combined cycle plant according to this embodiment will be described below with reference to the timing chart illustrated in FIG. 6.

When the gas turbine 10 and the steam turbine 30 operate steadily, the fuel flow control valve 52 is controlled to the degree of opening corresponding to the fuel flow rate generated from the second fuel flow rate generator of the fuel controller 110. The intake air regulator is controlled to the degree of opening corresponding to the second degree of opening G2 generated by the second opening generator 122 of the IGV controller 120. At this time, the second opening generator 122 serves as the third opening generator and the sixth opening generator. The second opening generator 122 outputs the second degree of opening G2 as the third degree of opening G3 when serving as the third opening generator, and outputs the second degree of opening G2 as a sixth degree of opening G6 when serving as the sixth opening generator. The steam flow control valve 22 is basically kept in the fully opened state.

An operator operates the stop mode receiver 160 of the control device 100 before the combined cycle plant is stopped, and inputs whether to set the stop mode of the steam turbine 30 to the cooling stop mode or the normal stop mode to the control device 100. The mode-recognizing unit 127 recognizes whether the stop mode of the steam turbine 30 is the cooling stop mode or the normal stop mode on the basis of the operation result of the stop mode receiver 160 (stop mode-recognizing step).

When the control device 100 receives a load command indicating stop of the combined cycle plant from the outside (t6), the second fuel flow rate generator 112 of the fuel controller 110 outputs the fuel flow rate corresponding to a load included in the load command. That is, the second fuel flow rate generator 112 outputs the fuel flow rate which gradually decreases. Accordingly, the output of the gas turbine 10 gradually decreases and the output of the steam turbine 30 also gradually decreases.

When the output PW detected by the output meter 63 becomes equal to or less than the predetermined output PW1 (t7) after the load command indicating the stop of the combined cycle plant is input from the outside, the fifth determiner 152 of the closing condition-determining unit 151 in the steam controller 140 determines that the closing condition of the steam flow control valve 22 is satisfied and outputs "1." When "1" is output from the closing condition-determining unit 151, the closing-opening generator 156 generates a degree of opening that decreases at a predetermined variation rate. As described above, the command output unit 157 outputs a command corresponding to the degree of opening generated by the closing-opening generator 156 to the steam flow control valve 22. Accordingly, the degree of opening of the steam flow control valve 22 gradually decreases thereafter.

When the output PW detected by the output meter 63 becomes equal to or less than the predetermined output PW1 and the closing condition-determining unit 151 of the steam controller 140 determines that the closing condition of the steam flow control valve 22 is satisfied and outputs "1" (t7), the output "1" is also input to the first a switch command generator 131a of the IGV controller 120. When the mode-recognizing unit 127 recognizes that the stop mode is the normal stop mode and "1" indicating that the closing condition of the steam flow control valve 22 is satisfied is received from the closing condition-determining unit 151 in the steam controller 140 (t7), the first a switch command generator 131a issues the switch command "0." When the switch command "0" is received, the first switch 124 outputs the second degree of opening G2 of the first degree of opening G1 and the second degree of opening G2 (command output step). The first switch 124 outputs the second degree of opening G2 of the first degree of opening G1 and the second degree of opening G2 when the gas turbine 10 and the steam turbine 30 operate steadily. Accordingly, even when the first switch 124 receives the switch command "0" at this time, the degree of opening output before and after the switch command "0" is received is kept at the second degree of opening G2. Immediately after the switching of the first switch 124, the second opening generator 122 serves as the fifth opening generator. When serving as the fifth opening generator, the second opening generator 122 outputs the second degree of opening G2 as a fifth degree of opening G5.

Accordingly, even when the stop mode is the normal stop mode and the closing condition of the steam flow control valve 22 is satisfied, the command corresponding to the second degree of opening G2 generated by the second opening generator 122 is sent to the intake air regulator 14. The function Gx2 of the second opening generator 122 basically indicates the degree of opening having a positive correlation with the variation of the output PW as the second degree of opening G2 as described above with reference to FIG. 3. Here, when the output PW detected by the output meter 63 is equal to or less than the predetermined output PW1, the function Gx2 indicates the constant degree of opening b. Accordingly, after the output PW detected by the output meter 63 becomes equal to or less than the predetermined output PW1 and the closing condition of the steam flow control valve 22 is satisfied (t7), the second degree of opening G2 output from the first switch 124 is the constant degree of opening b. The constant degree of opening b is sent to the command output unit 128 via the limiter 126. The command output unit 128 outputs a command indicating the constant degree of opening b to the intake air regulator 14.

When the control device 100 receives a parallel-off command ordering that the electrical connection between the power generator 40 and the external system power line be cut off from the outside (t8), the breaker is opened and the electrical connection between the power generator 40 and the external system power line is cut off. As a result, the output PW from the output meter 63 becomes 0 from the time point (t8).

On the other hand, when the mode-recognizing unit 127 recognizes that the stop mode is the cooling stop mode, the output PW detected by the output meter 63 becomes equal to or less than the predetermined output PW1, and the closing condition-determining unit 151 of the steam controller 140 determines that the closing condition of the steam flow control valve 22 is satisfied and outputs "1" (t7), the first a switch command generator 131a issues the switch command "1" to the opening control in the cooling stop mode. When the switch command "1" is received, the first switch 124 outputs the constant degree of opening c which is the first degree of opening G1 of the first degree of opening G1 and the second degree of opening G2. The first degree of opening G1 is sent to the limiter 126 via the second switch 125. The degree of opening immediately before the switching of the first switch 124 is the degree of opening b. On the other hand, the degree of opening immediately after the switching of the first switch 124 is the constant degree of opening c which is the first degree of opening G1 generated by the first opening generator 121. The limiter 126 limits the variation rate of the degree of opening from the first opening generator 121 such that the variation rate of the degree of opening of the intake air regulator 14 becomes equal to or less than the predetermined variation rate. That is, the limiter 126 limits the variation rate of the degree of opening from the first opening generator 121 such that the degree of opening gradually increases from the degree of opening b before the switching of the second switch 125 to the degree of opening c. The variation rate of the degree of opening at this time may be different from the variation rate of the degree of opening when the rotational speed N detected by the rotational speed meter 64 becomes equal to or greater than the rated rotational speed N1 (t1) and the degree of opening is switched from the degree of opening b to the degree of opening c. In this case, the limiter 126 receives the switch command "1" from the first a switch command generator 131a and changes the variation rate of the degree of opening. When the degree of opening to be output becomes the degree of opening c, the limiter 126 continuously outputs the degree of opening c. The command output unit 128 outputs a command indicating the degree of opening output from the limiter 126 to the intake air regulator 14 (command output step). Immediately after the switching of the first switch 124, the first opening generator 121 serves as the fourth opening generator. When serving as the fourth opening generator, the first opening generator 121 outputs the first degree of opening G1 as a fourth degree of opening G4.

As described above, in this embodiment, when the stop mode of the steam turbine 30 is the cooling stop mode, the degree of opening of the intake air regulator 14 is set to be greater than in the normal stop mode. On the other hand, in this embodiment, the flow rate control of fuel to be supplied to the combustor 15 of the gas turbine 10 is the same in the cooling stop mode and in the normal stop mode. Accordingly, in this embodiment, an air flow rate relative to the fuel flow rate supplied to the gas turbine 10 is greater in the cooling stop mode than in the normal stop mode. As a result, in this embodiment, the temperature of combustion gas is lower and the temperature of steam is also lower in the cooling stop mode than in the normal stop mode. In this embodiment, when the cooling stop mode is selected as the stop mode of the steam turbine 30, the temperature of steam is lower than in the normal stop mode, and it is thus possible to lower the temperature of the steam turbine 30 in a short time.

In this embodiment, the opening control in the cooling stop mode and the opening control in the normal stop mode are performed using the first degree of opening G1 from the first opening generator 121 and the second degree of opening G2 from the second opening generator 122 appropriately. Accordingly, in this embodiment, it is possible to control the degree of opening of the intake air regulator 14 in the course of stopping the steam turbine 30 using a simple method. In other words, in this embodiment, it is possible to simplify the configuration of the IGV controller 120 that controls the degree of opening of the intake air regulator 14 in the course of stopping the steam turbine 30.

In this embodiment, similarly to the opening control of the intake air regulator 14 before the supplying of steam to the steam turbine 30 is started, even when there is a difference between one degree of opening and another degree of opening at the time of switching one of the degrees of opening generated from the opening generators to another, the degree of opening gradually varies from one degree of opening to another degree of opening and it is thus possible to suppress disorder of the control system at the time of switching the degree of opening. Accordingly, in this embodiment, similarly to the opening control of the intake air regulator 14 before the supplying of steam to the steam turbine 30 is started, it is possible to suppress disorder of the control system even using the first degree of opening G1 from the first opening generator 121 and the second degree of opening G2 from the second opening generator 122 appropriately as described above.

In the above-described embodiment, the first opening generator 121 has the independent function Gx1 and generates the first degree of opening G1 using the function Gx1. However, the first opening generator may add a predetermined value to the second degree of opening G2 generated by the second opening generator.

In the above-described embodiment, the first degree of opening G1 which is employed when the start mode is the cold mode and the first degree of opening G1 which is employed when the stop mode is the cooling stop mode are equal to each other. However, the first degree of opening G1 which is employed when the start mode is the cold mode and the degree of opening which is employed when the stop mode is the cooling stop mode do not have to be equal to each other.

INDUSTRIAL APPLICABILITY

According to one aspect of the present invention, it is possible to suppress a temperature difference between a temperature of a steam contact portion of a steam turbine and a temperature of steam flowing therein at the time of start by simple control. According to another aspect of the present invention, it is possible to lower the temperature of the steam contact portion in a short time at the time of stop of the steam turbine.

REFERENCE SIGNS LIST

10 Gas turbine
11 Compressor
14 Intake air regulator
15 Combustor
20 Exhaust heat recovery boiler
21 Steam line
22 Steam flow control valve
23 Condenser
24 Feed line
30 Steam turbine
40 Power generator
51 Fuel line
52 Fuel flow control valve
61 Steam thermometer
62 Metal thermometer
63 Output meter
64 Rotational speed meter
100 Control device
110 Fuel controller
120 IGV controller
121 First opening generator (fourth opening generator)
122 Second opening generator (third opening generator, fifth opening generator, sixth opening generator)
124 First switch (third switch)
125 Second switch
126 Limiter
127 Mode-recognizing unit
128 Command output unit
140 Steam controller
160 Stop mode receiver

The invention claimed is:

1. A control device of a combined cycle plant including a gas turbine that is driven by combustion gas, an exhaust heat recovery boiler that generates steam by heat of the combustion gas discharged from the gas turbine, and a steam turbine that is driven by the steam, in which the gas turbine includes an intake air regulator that regulates an amount of intake air, the control device comprising:
   a mode-recognizing unit that recognizes a start mode and a stop mode of the steam turbine; and
   a command output unit that outputs a command to the intake air regulator,
   wherein the mode-recognizing unit is configured to recognize a stop mode at time of stop of the steam turbine is either a cooling stop mode in which a temperature of a steam contact portion at the time of stop of the steam turbine is lower than a predetermined temperature or another stop mode different from the cooling stop mode in which the temperature of the steam contact portion is equal to or higher than the predetermined temperature,
   wherein the command output unit is configured to output a command to the intake air regulator so as to control a degree of opening of the intake air regulator when both of the steam turbine and the gas turbine are stopped, wherein the degree of opening of the intake air regulator is controlled to be a first degree when the stop mode is determined to be the cooling stop mode, the degree of opening of the intake air regulator is controlled to be a second degree when the stop mode is determined to be the other stop mode different from the cooling stop mode, and the first degree has a larger value than that of the second degree, and
   wherein the command output unit outputs a command indicating a degree of opening corresponding to the start mode or the stop mode recognized by the mode-recognizing unit to the intake air regulator.

2. A combined cycle plant comprising:
   the control device according to claim 1;
   the gas turbine;
   the exhaust heat recovery boiler; and
   the steam turbine.

3. A control method of a combined cycle plant including a gas turbine that is driven by combustion gas, an exhaust heat recovery boiler that generates steam by heat of the combustion gas discharged from the gas turbine, and a steam turbine that is driven by the steam, in which the gas turbine includes an intake air regulator that regulates an amount of intake air, the control method comprising:
   a stop mode-recognizing step of recognizing a stop mode at time of stop of the steam turbine is either a cooling stop mode in which a temperature of a steam contact portion at the time of stop of the steam turbine is lower than a predetermined temperature or another stop mode different from the cooling stop mode in which the temperature of the steam contact portion is equal to or higher than the predetermined temperature; and
   a command output step of outputting a command to the intake air regulator so as to control a degree of opening of the intake air regulator when both of the steam turbine and the gas turbine are stopped, wherein the degree of opening of the intake air regulator is controlled to be a first degree when the stop mode is determined to be the cooling stop mode, the degree of opening of the intake air regulator is controlled to be a second degree when the stop mode is determined to be the other stop mode different from the cooling stop mode, and the first degree has a larger value than that of the second degree.

4. The control method according to claim 3, wherein the combined cycle plant includes a steam flow control valve that controls a flow rate of the steam flowing in the steam turbine, and
   the command output step includes outputting a command corresponding to the first degree of opening on the condition of recognizing in the stop mode-recognizing step that the stop mode is the cooling stop mode and closing of the steam flow control valve is started when the steam turbine along with the gas turbine are stopped, and outputting a command corresponding to the second degree of opening on the condition of recognizing in the stop mode-recognizing step that the stop mode is the different stop mode and the closing of the steam flow control valve is started when the steam turbine along with the gas turbine are stopped.

5. The control method according to claim 4, wherein the command output step includes outputting a command corresponding to a third degree of opening of which the degree of opening of the intake air regulator immediately before the closing of the steam flow control valve is started is the same as the second degree of opening at time of start of the closing of the steam flow control valve, before the closing of the steam flow control valve is started when the steam turbine is stopped, and the command output step includes outputting a command indicating a degree of opening which gradually varies from the third degree of opening to the first degree of opening upon recognizing in the stop mode-recognizing step that the stop mode is the cooling stop mode and the closing of the steam flow control valve is started when the steam turbine is stopped, and outputting a command indicating the first degree of opening after the degree of opening becomes the first degree of opening.

* * * * *